United States Patent [19]

Lemay et al.

[11] Patent Number: 5,142,682

[45] Date of Patent: Aug. 25, 1992

[54] TWO-LEVEL PRIORITY ARBITER GENERATING A REQUEST TO THE SECOND LEVEL BEFORE FIRST-LEVEL ARBITRATION IS COMPLETED

[75] Inventors: Richard Lemay, Carlisle; David Wallace, Chelmsford, both of Mass.

[73] Assignee: Bull HN Information Systems Inc., Billerica, Mass.

[21] Appl. No.: 644,691

[22] Filed: Jan. 22, 1991

Related U.S. Application Data

[63] Continuation of Ser. No. 405,059, Sep. 7, 1989, abandoned, which is a continuation of Ser. No. 30,328, Mar. 26, 1987, abandoned.

[51] Int. Cl.⁵ ................. G06F 13/18; G06F 15/16
[52] U.S. Cl. ..................... 395/725; 395/325; 395/425; 364/DIG. 1; 364/DIG. 2; 340/825.50
[58] Field of Search ... 364/200 MS File, 900 MS File, 364/DIG. 1, DIG. 2; 395/725, 425, 325; 340/825.50

[56] References Cited

U.S. PATENT DOCUMENTS

| | | | |
|---|---|---|---|
| 4,257,095 | 3/1981 | Nadir | 364/200 |
| 4,275,458 | 6/1981 | Khera | 364/900 |
| 4,314,335 | 2/1982 | Pezzi | 364/200 |
| 4,326,250 | 4/1982 | McCullough | 364/200 |
| 4,394,728 | 7/1983 | Comfort et al. | 364/200 |
| 4,449,183 | 5/1984 | Flahive et al. | 364/200 |
| 4,467,418 | 8/1984 | Quinquis | 364/200 |
| 4,482,950 | 11/1984 | Dshkhunian et al. | 364/200 |
| 4,493,036 | 1/1985 | Boudreau et al. | 364/200 |
| 4,604,685 | 8/1986 | Brown et al. | 364/200 |
| 4,628,447 | 12/1986 | Cartret et al. | 364/200 |
| 4,755,938 | 6/1988 | Takahashi et al. | 364/200 |
| 4,779,089 | 10/1988 | Theus | 364/200 |
| 4,787,033 | 11/1988 | Bomba et al. | 364/200 |

FOREIGN PATENT DOCUMENTS 57-164338 10/1982 Japan.

*Primary Examiner*—Thomas C. Lee
*Assistant Examiner*—L. Donaghue
*Attorney, Agent, or Firm*—John S. Solakian

[57] ABSTRACT

A priority resolver shortens the time between a requesting circuit initiating a request for access to a requested circuit that is shared with other circuits and the requesting circuit actually functioning with the requested circuit. A first portion of the priority resolver circuit is associated with the requesting circuit and makes a request for access to another portion of the priority resolver circuit associated with the requested circuit before the first portion has chosen the highest priority one of a plurality of requesting circuits that have concurrently bid for access to the requested circuit. Before the portion of the priority resolver associated with the requested circuit can respond to the access request and return an access grant signal, the first portion of the priority resolver circuit has chosen the highest priority requesting circuit. In this manner the time for accessing requested circuits is decreased.

8 Claims, 2 Drawing Sheets

TWO-LEVEL PRIORITY ARBITER GENERATING A REQUEST TO THE SECOND LEVEL BEFORE FIRST-LEVEL ARBITRATION IS COMPLETED

This application is a continuation of application Ser. No. 07/405,059, filed Sep. 7, 1989, now abandoned, which is a continuation of application Ser. No. 07/030,328, filed Mar. 26, 1987, now abandoned.

FIELD OF THE INVENTION

This invention relates to priority resolvers used in computer systems for deciding access to a first circuit by a plurality of other circuits.

BACKGROUND OF THE INVENTION

In the prior art, computer circuits request access to each other to accomplish different functions associated with processing. These requests usually occur asynchronously. For example, use of a memory may be requested by a processor via a bus or may be requested by an input/output device via a direct memory access bus which is different than the bus used by the processor. A bus itself is a resource, the use of which is requested by many computer circuits. Whether a circuit or a bus is being accessed by a plurality of circuits, because more than one circuit may request access or use of another circuit, priority resolvers are needed to assure that only one requesting circuit at a time is granted access to a requested circuit, bus or other resource. When there is more than one simultaneous request for the same circuit or resource, the requesting circuit with the highest priority is preferentially granted access to the circuit or resource.

A problem with prior art circuit access priority resolution circuits is that an access grant output from one priority resolution circuit will sometimes be an access request to a second priority resolution circuit. Each priority resolution circuit has a finite period of time in which it performs its function and grant access to one of a plurality of requesting circuits that are simultaneously requesting access to another circuit or resource. Only after a decision has been made and access granted to the highest priority requesting circuit to a first priority resolution circuit is an access request made to a second priority resolution circuit. This typical sequence of operations is serial in nature and uses a finite period of time. The finite periods of time involved in priority resolution contribute to limiting the speed of operation of the computer.

Thus, there is a need in the art for a method and apparatus to provide a method and new priority resolver apparatus that can perform its function while shortening the time typically required to connect a requesting circuit to a requested circuit.

SUMMARY OF THE INVENTION

The above stated and other needs of the prior art are satisfied by the present tandem priority resolver which shortens the time between a requesting circuit initiating a request for access to a requested circuit and the requesting circuit actually functioning with the requested circuit. To shorten this time, functions that have heretofore been performed in the priority resolution circuits in a serial fashion are performed in parallel or tandem.

More particularly, a first portion of the novel priority resolver circuit taught herein and associated with an access requesting circuit makes a request for access to another portion of the priority resolver circuit associated with the requested circuit before the first portion has chosen the highest priority one of a plurality of requesting circuits that have concurrently bid for access to the requested circuit. Before the portion of the priority resolver associated with the requested circuit can respond to the access request and return an access grant signal, the first portion of the priority resolver circuit has chosen the highest priority requesting circuit. In this manner the time for accessing requested circuits is decreased and the overall speed of processing in the computer system is increased.

DESCRIPTION OF THE DRAWING

The invention will be better understood upon reading the following detailed description in conjunction with the drawing in which.

DETAILED DESCRIPTION

Figure 1:
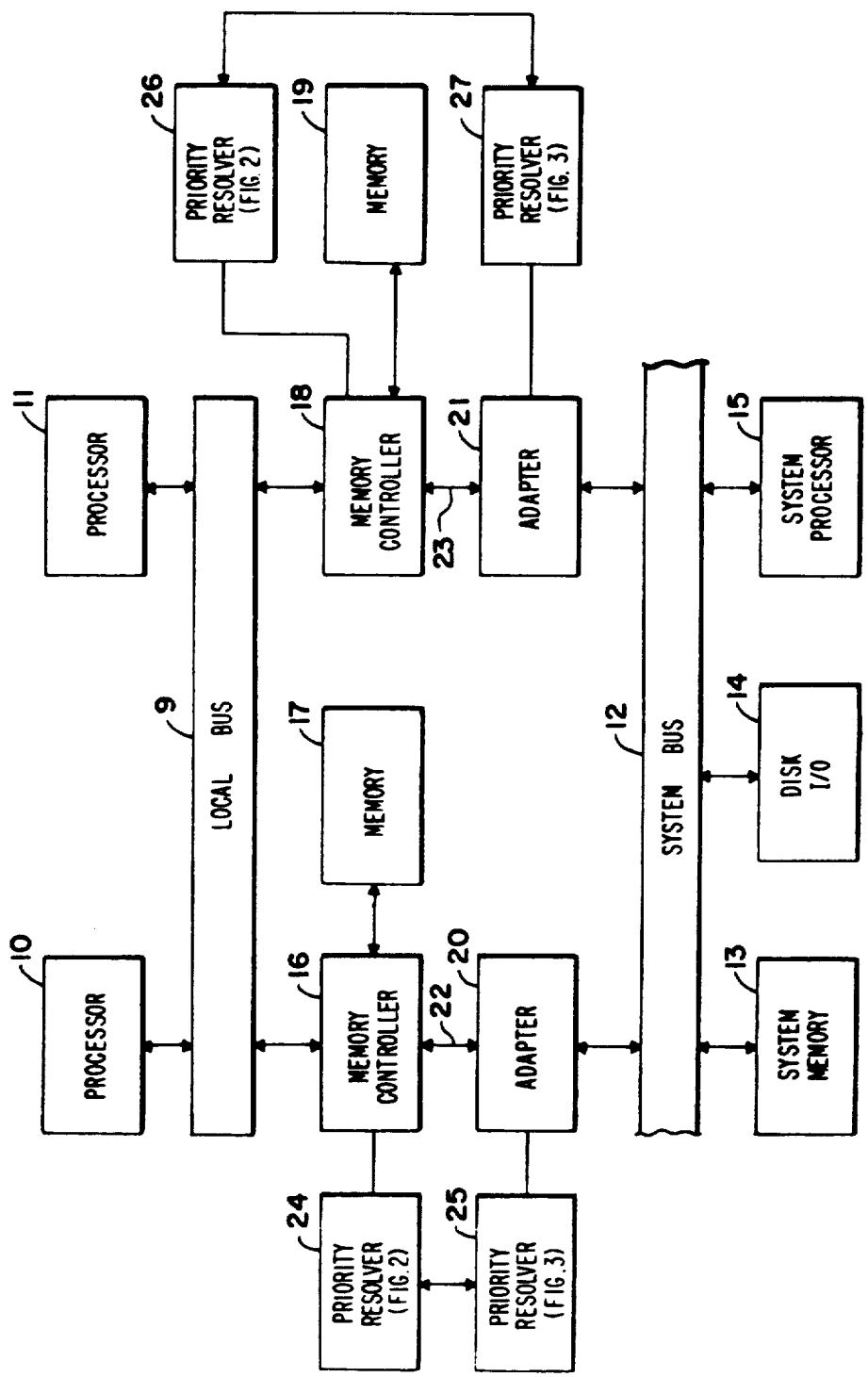
FIG. 1 is a block diagram of a portion of a computer system having shared memory, memory controllers and adapters that utilize the present tandem priority resolver to improve the operating efficiency of the computer system.

In FIG. 1 is shown a block diagram of a portion of a computer system with memory controllers and adapters with which the novel tandem priority resolver is shown utilized. Processor 10 and 11 cooperate with system processor 15 in a multiprocessing arrangement to process application programs.

Memories 17 and 19 are large capacity memories basically dedicated to the joint use of application program processors 10 and 11 to increase their operating efficiency, and to increase the efficiency of use of memories 17 and 19. Memories 17 and 19 are respectively associated with memory controller 16 and memory controller 18 which control access to the memories from several sources. Processors 10 and 11 are not connected directly to system bus 12, but rather are connected to a local bus 9. Memories 17 and 19 are also not connected to the system bus. Also connected to local bus 20 are the memory controllers 16 and 17. Memory controllers 16 and 18 control shared access to their respective associated memories 17 and 19 by processor 10 and processor 11. In this manner the chances of either processors 10 or 11 having to wait to gain access to a memory are decreased.

Memories 17 and 19 may also be accessed from system bus 12 via adapters 20 and 21 respectively to load application programs and data to be processed into these memories for subsequent use by processors 10 and 11. Similarly, memories 17 and 19 may be read out to circuits connected to system bus 12.

In addition, processors 10 and 11 each have access via memory controllers 16 and 17 and adapter circuits 18 and 19 respectively connected thereto to system bus 12 to gain access to other storage circuits connected thereto such as system memory 13 and disk I/O 14.

Figure 3:
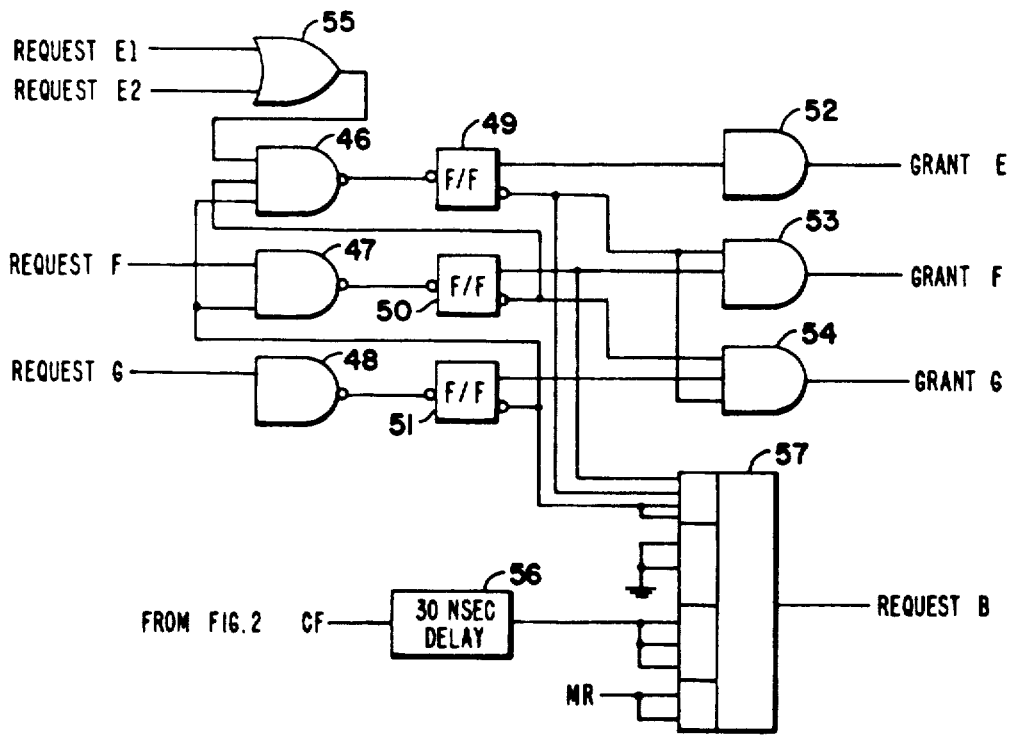
FIG. 3 is a block diagram schematic of second portion of the tandem priority resolver associated with a requested circuit in accordance with the teaching of the invention.

There are four basic types of memory read and write transactions that can be performed by the system configuration shown in block diagram form in FIG. 1. First processor 10 may read or write to memory 17 associated with memory controller 16, processor 11 may read or write to memory 19 associated with memory controller 18, processor 10 may read or write to memory 19 associated with memory controller 18, and processor 11 may read or write to memory 17 associated with memory controller 16. Access between processors 10 and 11 and memory controllers 16 and 18 for these transactions is via local bus 20 and a switching circuit that is part of memory controllers 16 and 18 as shown in FIG. 3. These transactions never access other storage circuits connected to system bus 12.

There are also transactions wherein some circuits connected to system bus 12, such as processor 15, may request and gain access to memories 17 and 19 to write programs or data therein for use by processors 10 and 11, or to read processed data from these memories. A request to access memory 17 associated with memory controller 16 is always made via adapter 20, and a request to access memory 19 associated with memory controller 18 is always made via adapter 21.

With another type of transaction processors 10 or 11 can read or write system memory 13 or other storage circuits connected to system bus 12. To implement this type of transaction processor 10 must access only memory controller 16, and processor 11 must access only memory controller 18. When memory controller 16 is seized by processor 10, controller 16 determines if a memory address received from processor 10 is to memory 17 and further determines if memory 17 is to be accessed. Upon determining that memory 17 is not to be accessed, memory controller 16 forwards the read or write request via adapter 20 to system bus 12. After memory controller 16 passes a memory read request to adapter 20 to be placed on system bus 12, memory controller 16 is not free to service other read or write requests from processor 10 until the read operation to system memory 13 is completed. However, memory controller 16 can still service read or write requests to memory 17 from processor 11. Write operations to system memory 13 are considered completed as soon as the request, address and data are passed to adapter 20, and memory controller 16 can then process other read or write requests from processor 10. When the request is for a read operation the program or data will be returned, and can only be returned over the same path that the request is made on. In addition, when adapter 20 receives the returned program or data it must make an access request to memory controller 16, and when that request is granted an appropriate connection is established through memory controller 16 and adapter 20 returns the data or program to processor 10. Thereafter, processor 10 is again free to request memory read or write operations from controllers 16 or 18. Similarly, processor 11 can access system memory 13 or other storage circuits via its associated memory controller 18 and adapter 21.

The last type of transaction is a lock cycle transaction wherein, for example, processor 10 can perform a read lock of either memory 17 or memory 19, but the read operation is not done directly through memory controller 16. Assuming processor 10 wants to do a read lock on memory 17, the address and read request sent to memory controller 16 is not used to read memory 17, but instead is passed to adapter 20. Adapter 20 places the read request and address onto system bus 12 and then recognizes that the address is to memory 17. Adapter 20 answers the request it just placed on bus 12 and receives the read request and address. Then adapter 20 makes a request for connection to memory controller 16 and memory 17. When that request is granted reading of memory 17 takes place. The information read out of memory 17 is returned to adapter 20 rather than to processor 10. Adapter 20 takes the information read out of memory 17 and destination and places it onto system bus 12. Adapter 20 then recognizes that the information it just placed on bus 12 is for processor 10 and restores the information. Adapter 20 again makes a request for use of controller 16. When this request is granted adapter 20 returns the information via memory controller 16 and local bus 20 to processor 10.

Similarly, if processor 10 requests a read lock operation to memory 19, the read request and address are passed via memory controller 16 and adapter 20 to system bus 12 as mentioned in the last paragraph. However, adapter 21 recognizes that the read request is for memory 19 and takes the request and address from system bus 12. Adapter 21 makes a request for memory controller 18 to read memory 19, and when the request is granted memory 19 is read. Alike the read lock operation described in the last paragraph the information read out of memory 19 is returned through memory controller 18 and adapter 21 to system bus 12. Adapter 20 recognizes that the information on bus 12 is for processor 10 and stores the information. Adapter 20 then makes a request for use of memory controller. When this request is granted adapter 20 returns the information via memory controller 16 and local bus 20 to processor 10.

While the read lock operation described in the last two paragraphs is initiated by processor 10 to either memory 17 or memory 19, processor 11 can also request read lock operation to memories 17 and 19 and the operation is the same as that described in the last two paragraphs.

With processors 10 and 11 and adapter 20 all requesting access to memory controller 16, and processors 10 and 11 and adapter 21 all requesting access to memory controller 18, the prior art has recognized the need for priority resolution circuits for controlling the access to circuits 16 and 18. With different circuits requesting access through adapters 20 and 21 to memory controllers 16 and 18 respectively, priority resolution circuits are also needed for controlling access to the adapters.

In the following description only circuits 16, 17, 20, 24 and 25 are referred to but the description equally applies to circuits 18, 19, 21, 26 and 27.

When access is being requested through adapter 20 and memory controller 16 to either processor 10 or memory 17 the priority resolution circuits associated with circuits 16 and 20 must both operate, and in the prior art they operate in a serial fashion (one resolver making its decision before requesting of the other) which creates a problem. The problem is caused by the finite period of time in which these circuits operate to perform their function and grant access to one of a plurality of requesting circuits that are simultaneously requesting access to another circuit. Only after a decision has been made with regards to a first circuit (i.e. adapter 20) is the process repeated with regards to another circuit (i.e. memory controller 16). The requested circuit or resource must then respond and return a signal to the chosen requesting circuit to commence operation. Responsive to the return signal the chosen requesting circuit then commences performing an operation with the requested circuit. This typical sequence of operations is serial in nature and uses a finite period of time for each step. The finite periods of time add up and contribute to limiting the speed of operation of the computer.

The use of the present invention eases the problem described in the last paragraph by shortening the time between a requesting circuit initiating a request for access to a requested circuit and the requesting circuit actually functioning with the requested circuit.

In FIG. 1 the portion of the novel tandem priority resolver that functions with memory controller 16 is priority resolver 24, and the portion that functions with adapter 20 is priority resolver 25. Similarly resolver portions 26 and 27 function respectively with memory controller 18 and adapter 21. To shorten the overall operating period a priority resolution function that has heretofore been performed in a serial fashion is now performed in parallel or tandem with other functions. This operation is described clearly in the remainder of the specification with reference to FIGS. 2 and 3.

Briefly, to shorten circuit access time priority resolver circuit 25 taught herein makes a request to priority resolver circuit 24 for access to a requested shared circuit such as memory 17 before it has chosen the highest priority one of a plurality of requesting circuits that have concurrently bid for access to the requested circuit. Before priority resolver circuit 24 associated with the requested circuit can respond to the access request, priority resolver circuit 25 has chosen the highest priority requesting circuit to have access to and function with the requested circuit. In this manner the time for accessing requested circuits is decreased and the overall speed of processing in the computer system is increased.

Figure 2:
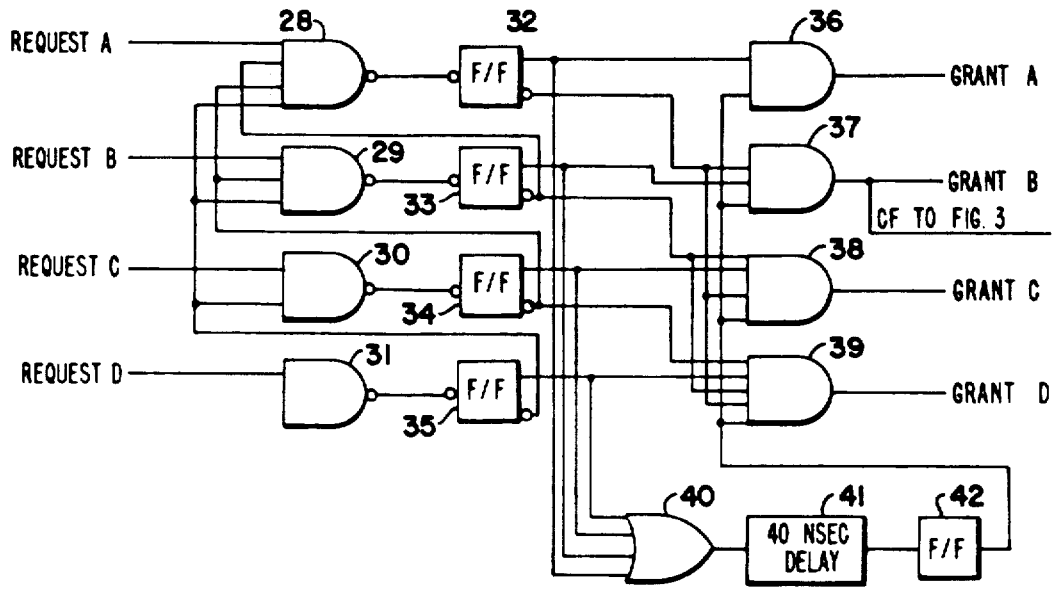
FIG. 2 is a block diagram schematic of a first portion of the tandem priority resolver associated with a requesting circuit in accordance with the teaching of the present invention.

One embodiment of novel tandem priority resolver consists of the circuits shown in FIGS. 2 and 3. The circuit in FIG. 2 is associated with memory controller 16 and the circuit in FIG. 3 is associated with adapter 20. The circuits in FIGS. 2 and 3 operate in tandem and cooperate to resolve the priority of access requests to memory controller 16 by adapter 20, processor 10, processor 11, and a memory refresh circuit (not shown but well known in the art). Although the operation of the priority resolver is described with memory controller 16 and adapter 20, the resolver can work with almost any two circuits that must bid for access to each other.

There is another tandem priority resolver circuit associated with memory controller 18 and adapter 21 that functions in the exact same manner and for the same purpose. Accordingly, to avoid duplication, only the tandem priority resolver circuits associated with memory controller 16 and adapter 20 are described in this specification.

In FIG. 2 is shown the part of the priority resolver that is associated with memory controller 16 and decides access thereto from other circuits. Request A is a signal from a memory refresh circuit that is not shown or described but which is well known in the art. Memory 17 must be periodically refreshed or its contents are lost as is known in the art. Accordingly, memory refresh Request A has the highest priority access to memory controller 16. Request B is from adapter 20 and requests access to memory controller 16 in order to read or write memory 17. Request C is from processor 11 and requests access to memory controller 16 in order to read or write memory 17. Request D is from processor 10 and requests access to memory controller 16 in order to read or write memory 17, to gain access via adapter 20 to system bus 12 to gain access to circuits thereon, or to gain access to system bus 12 to perform, for example, a semaphore operation. Request A has the highest priority and Request D has the lowest priority.

The circuit in FIG. 2 responds to a single request signal at one of its four Request inputs to grant the request. When there is more than one request for access to memory controller 16 via the four Request inputs the highest priority request is first granted access and, thereafter, other requests are granted access in decreasing order of priority.

Whichever request is granted access has its corresponding Grant output go high. For example, if Request B has the highest priority and is granted access, the Grant B output goes high.

As is known in the art, within memory controller 16 there are gates for steering control and data signals through the controller. These gates are selectively operated enabled depending upon which access requesting circuit has been granted access by priority resolver 24. Accordingly, in a manner well known in the art the Grant outputs from resolver 24 and other signals, such as timing signals, are input to a control circuit (not shown) within memory controller 16. The control circuit responds to its inputs to generate output signals that selectively enable the gates within memory controller 16. The details of an exemplary prior art memory controller are not described herein to avoid detracting from the invention.

As may be seen in FIG. 2 each Request input is one input to an AND gate and the output thereof is used to set a corresponding flip-flop. For example, Request B is input to AND gate 29 the output of which is connected to and used to set flip-flop 33. The upper output is an affirmative output of each of the flip-flops 32 through 35 and is connected to an input of a respective one of AND gates 36 through 39 as shown, and these save outputs from flip-flops 32-35 are also all input to OR gate 40. The outputs from AND gates 36 through 39 are the Grant outputs, that are connected to control circuitry within memory controller 16 and, in addition, are returned to control circuits within requesting circuits so that they know access has been granted and commence operation.

The lower output from each of flip-flops 32 through 35 is a non-affirmative output and are at a one level when the flip-flops are in their normal or non-operated state. The normal state exists when there are no access requests and grants made by the circuit in FIG. 2. The non-affirmative output from flip-flop 35, which is normally at a one level, is connected to an input of each of higher priority input AND gates 28-30 as shown. The non-affirmative output from flip-flop 34 is connected to an input of each of input AND gates 28 and 29. Finally, the non-affirmative output from flip-flop 33 is connected to an input of input AND gate 28. With the connections to the input AND gates 28-30 just described, normally all inputs of these gates are high except for the Request input. When there is a request signal on a Request input the last input of its input AND gate is high and there is an output. For example, the lower three inputs of AND gate 28 are normally high, and when there is a request on Request input A the last input is high and there is an output from AND gate 28. The output from each of AND gates 28 through 31 is inverted, but is reinverted by the inverting input of the respective ones of flip-flops 32 through 35 to which the input AND gates are respectively connected. Accordingly, when the circuit in FIG. 2 is idle and a request signal appears, the input AND gate to which it is connected provides an output which changes the state of the flip-flop to which the output of the gate is connected. For example, a request signal on Request input C will change flip-flop 34 from its normal state to a set state with its affirmative output high, which is a one level. The preferred implementation requires that flip-flops 32-35 and 49-51 be chosen such that their metastable characteristic is appropriate for the delay timing of delay circuit 41. Delay circuit is a 74F74 available from Fairchild Semiconductor.

As mentioned previously, the affirmative or one output from each of flip-flops 32 through 35 is connected to an input of an associated one of AND gates 36-39 as shown in FIG. 2. When the affirmative or one output of one of flip-flops 32-35 is changed to its one state by a Request signal, it causes said one input of its associated one of AND gates 36-39 to be high. For there to be an output from these AND gates all other inputs must also be high. This is done by the non-affirmative outputs from flip-flops 32-35. The non-affirmative outputs are normally at a one or high level as previously mentioned. The non-affirmative output of flip-flop 32 is connected to one of the inputs of lower priority level AND gates 37-39, and the non-affirmative output of flip-flop 33 is connected to one of the inputs of lower priority level AND gates 38 and 39. Finally, the non-affirmative output of flip-flop 34 is connected to one of the inputs of lower priority level AND gate 39.

When there are no present access requests flip-flops 32-35 are all in their normal state as previously described. Inputs to AND gates 28-31 and 36-39 that are connected to the non-affirmative output of flip-flops 32-35 are all high. The appearance of a request signal on any one of the Request inputs will thereby result in a corresponding one of flip-flips 32-35 being set. For example, Request B will cause an output from input AND 29 which will set flip-flop 33 and its affirmative (upper) output is high while its non-affirmative (lower) output is low. This in turn causes all inputs of output AND gate 37 to be high so there is a high output from this gate. This high output is the Grant B signal. As previously mentioned Request B came from adapter 20 for a read or write operation to memory 17. The Grant B signal cause adapter 20 to commence its operation.

While adapter 20 has access to memory controller 16, flip-flop 33 remains set. Flip-flop 33 in its set or operated state has its non-affirmative output low. With the connections to the AND gates previously described, output AND gates 38 and 39 both have one low input which prevents them from providing a grant output as long as flip-flop 33 is set. Also, one input of input AND gate 28 is low which prevents a subsequent Request A from being granted until flip-flop 33 is released when a requesting circuit is finished with its function via adapter 20 to memory 17.

A delay line 41 provides a clock to flip-flop 42 which then provides one input to each of output AND gates 36-39 and must be high in order for there to be a Grant signal output from these AND gates. OR gate 40, delay circuit 41 and flip-flop 42 cooperate to delay the generation of a Grant signal for forty nanoseconds after a Request signal is received. This is done for two reasons. First, the time delay allows an operated one of flip-flops 32-35 to settle before the output AND gate connected thereto is allowed to operate. This assures more reliable circuit operation. Secondly, the delay permits a higher priority circuit to be granted access when two request signals are concurrently input at the Request inputs. For example, if Request A and Request C were received concurrently, their flip-flops 32 and 34 would be set at the same time. The operation of flip-flop 32 removes the high input to output AND gate 38 from the non-affirmative output of flip-flop 32. Shortly thereafter, the output of delay flip-flop 42 goes high and only output AND gate 36 has all its inputs high at that time. The higher priority level Grant A is generated.

The Grant B signal is connected via lead CF to the priority resolver in FIG. 3. The purpose is described further in this specification with reference to FIG. 3.

In FIG. 3 is shown the schematic block diagram of the other portion of the tandem priority resolver and which functions with adapter 20. The circuit in FIG. 3 is similar to the circuit in FIG. 2 that has been described in the previous paragraphs. There are only three Request inputs that are designated Request E, Request F and Request G. Adapter 20 has two queues in which it stores access requests received via system bus 12 in FIG. 1 to access memory controller 16 and thereafter read or write memory 17. These are Requests E1 and E2 which are input to OR gate 55 which combines them as a Request E to input AND gate 46. Request F is from another computer circuit called an accomodater that is not described herein. Request G is a request received from a circuit connected to system bus 12 in FIG. 1, not to access memory 17, but to establish a connection through memory controller 16 and then local bus 9 to processor 10. Request E has the highest priority while Request G has the lowest priority.

Input AND gates 46-48, flip-flops 49-51, and output AND gates 52-54 are all connected to each other and function with each other in the same manner as the like circuit components shown in and described with reference to FIG. 2. Accordingly, the operation of these circuits is not repeated here for the sake of brevity. However, the differences between the circuits in FIGS. 2 and 3 is described in detail.

The major difference between FIGS. 2 and 3 is that the non-affirmative (lower) output from each of flip-flops 49-51 are connected to inputs of an AND/OR-INVERT gate 57 which is an 74S64 gate available from Texas Instruments. The major function of gate 57 is to generate the Request B signal which is the adapter 20 request to the memory controller 16 priority circuitry of FIG. 2. When one of flip-flops 49-51 is operated in the process of granting an access request through adapter 20 to memory controller 16 there is a Request B request output from gate 57. This Request B is input to priority resolver 24 in FIG. 2 as described previously.

When the memory controller 16 priority resolver in FIG. 2 is in the process of granting adapter 20 access to memory controller 16, flip-flop 33 is operated. The Grant B output goes high and this high output is returned via lead CF and input to thirty nanosecond delay circuit 56 in FIG. 3. After being delayed thirty nanoseconds this high output is input to gate 57 as shown. In response to the delayed high input the Request B output from gate 57 is terminated. This allows for clearing flip-flop 33 in FIG. 2 without getting a duplicate request for access to memory controller 16 from adapter 20.

Thus, when a single request is being made to adapter 20 to access memory controller 16, there is a request E, F or G. At the same time that one of flip-flops 49-51 is operated adapter access Request B is generated and input to the memory controller priority resolver circuitry of FIG. 2. The request for access to memory controller 16 is made in tandem with priority resolution by the circuitry in FIG. 3. Before the memory controller priority resolver in FIG. 2 can honor Request B, the priority resolver in FIG. 3 generates a Grant output. This tandem operation speeds the overall operation of the priority resolution circuitry as compared to prior art operation. For concurrent access requests the highest priority request is granted first.

The MR input to gate 57 is of value when adapter 20 has been granted access via memory controller 16 to memory 17 to perform a read operation by the operation of the priority resolvers in both FIGS. 2 and 3. This MR input goes high when the requested data is read out of memory 17 and remains high until the requested data is returned via adapter 20 to the requesting circuit connected to system bus 12. This prevents other requests being made to access memory controller 16 from adapter 20 until the read operation is completed.

While what has been described hereinabove is the preferred embodiment of the invention those skilled in the art may make numerous changes therein without departing from the spirit and scope of the invention. For example, the number of Request inputs may be changed or the amount of delay provided by the delay circuits may be varied. In addition, the circuits that may utilize the tandem priority circuitry disclosed herein are numerous and go beyond the exemplary memory controller and adapter disclosed.

What is claimed is:

1. A priority resolution apparatus for use in a data processing system, the system comprising a plurality of interconnected devices,
   a plurality of first devices contending asynchronously for use of a second device,
      each of said first devices being assigned a unique priority for the use of the second device; and
      one certain first device receives asynchronous requests for use of the second device from a plurality of third devices and contends for use of the second device only in response to such requests, each of the third devices being assigned a unique priority for use of the second device,
   the priority resolution apparatus being for granting use of the second device to the highest-priority requesting first device, and in turn to the highest-priority requesting third device if said one certain first device is the highest-priority requesting first device, the priority resolution apparatus comprising in combination:
      a first priority resolver having as many request inputs as there are first devices, one input being connected to each of the first devices, for receiving from the respective first devices asynchronous requests for use of the second device and for granting use of the second device to the highest-priority requesting first device, and having signaling means for signaling that said one certain first device has been granted use of the second device; and
      said one certain first device being a second priority resolver having a signaling input connected to the signaling means of the first priority resolver and having as many request inputs as there are third devices, one request input being connected to each of the third devices, said second priority resolver being for:
         receiving from the respective third devices asynchronous requests for use of the second device,
         sending a request to the input of the first priority resolver immediately upon receiving a request from at least one of the third devices, and
         granting use of the second device to the highest-priority requesting third device upon being informed at the signaling input that said one certain first device has been granted use of the second device
      whereby the second priority resolver requests service from the first priority resolver before the second priority resolver has completed its arbitration.

2. The priority resolution apparatus recited in claim 8, wherein further
   granting use of the second device to a certain first device or a certain third device consists in sending a grant signal from the priority resolution apparatus to the certain first device or third device.

3. The priority resolution apparatus recited in claim 1, wherein each priority resolver further comprises:
   a first plurality of AND gates, each associated with a different one of the request priorities;
   a second plurality of AND gates equal in number to the first plurality of AND gates;
   a plurality of flip-flops equal in number to the first plurality of AND gates, each having a SET input and a RESET input associated with a ONE output and ZERO output respectively;

and wherein further:
   each request signal is applied to an input of a different AND gate of the first plurality of AND gates, each AND gate output from the first plurality of AND gates is connected to the SET input of a different flip-flop of the plurality of flip-flops, each flip-flop being associated with a request priority corresponding to that of the AND gate connected thereto, the ONE output of each flip-flop is applied to the input of a different AND gate of the second plurality of AND gates, each AND gate being associated with request priority corresponding to that of the flip-flop connected thereto, the outputs of the second plurality of AND gates are the respective grant signals, and the SET output of each flip-flop is connected to disabling inputs of all the AND gates of the first plurality of AND gates associated with higher priority and all the AND gates of the second plurality of AND gates associated with lower priority.

4. The priority resolution apparatus recited in claim 2, wherein further within the first priority resolver:
   said signalling means comprises a connection to the grant signal corresponding to a grant to the one certain first device.

5. The priority resolution apparatus recited in claim 3, wherein further within the first priority resolver:
   the ONE outputs of the first plurality of flip-flops are all input to an OR gate, the output of which is input to a delay line, the output of which is used to set a second flip-flop not in the first plurality of flip-flops, the ONE output of which enables the second plurality of AND gates.

6. A priority resolver network comprising first (25) and second (24) priority resolver circuits connected in tandem; each of said resolver circuits having a plurality of input terminals coupled to receive respective input signals (REQUEST E, F, G; REQUEST A, B, C, D)

representing different request for access to a resource, said request input signals being allocated different priorities by said resolver circuit according to the receiving input terminal; each of said resolver circuits having an output terminal for each input terminal thereof, said resolver circuit delivering an output signal (GRANT E, F, G; GRANT A, B, C, D) on the output terminal corresponding to the input terminal receiving the request input signal having the highest allocated priority of all the request input signals concurrently received by said priority resolver circuit;

said first priority resolver circuit comprising an element (57) for delivering an output request signal upon receipt of any request input signal thereby;

said output request signal being coupled to an input terminal of said second resolver circuit as one (REQUEST B) of the request input signals received thereby.

7. The priority network of claim 6, wherein further: said first resolver circuit comprises a flip-flop (49-51) for each input terminal for storing a representation of the receipt of a request input signal at the respective input terminal, wherein said element is coupled to all of said flip-flops for delivering said output request signal when any one or more of said flip-flops transits to a state representing the receipt of a request input signal.

8. The priority network of claim 7, wherein further: said first resolver circuit comprises a respective logical gate (52-54) coupled to each of said flip-flops, the output terminal of each of said gates being one of the output terminals of said first resolver circuit, the one of said gates which delivers an output signal on its output terminal being the gate corresponding to the one of the flip-flops in said state that corresponds to the highest allocated priority of the received request input signals.

* * * * *